US011092929B2

United States Patent
Hauger et al.

(10) Patent No.: US 11,092,929 B2
(45) Date of Patent: Aug. 17, 2021

(54) VISUALIZATION SYSTEM AND METHOD FOR GENERATING HOLOGRAPHIC PRESENTATIONS FROM OPTICAL SIGNALS

(71) Applicant: Carl Zeiss Meditec AG, Jena (DE)

(72) Inventors: Christoph Hauger, Aalen (DE); Stefan Saur, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 16/360,915

(22) Filed: Mar. 21, 2019

(65) Prior Publication Data

US 2019/0294103 A1 Sep. 26, 2019

(30) Foreign Application Priority Data

Mar. 21, 2018 (DE) .................... 10 2018 106 651.1

(51) Int. Cl.
*G03H 1/00* (2006.01)
*G03H 1/22* (2006.01)
*G03H 1/04* (2006.01)
*G06F 3/01* (2006.01)

(52) U.S. Cl.
CPC ......... *G03H 1/0005* (2013.01); *G03H 1/0443* (2013.01); *G03H 1/2202* (2013.01); *G03H 1/2249* (2013.01); *G03H 2001/005* (2013.01); *G03H 2001/0088* (2013.01); *G03H 2001/0452* (2013.01); *G03H 2210/30* (2013.01); *G03H 2240/50* (2013.01); *G06F 3/017* (2013.01)

(58) Field of Classification Search
CPC .. G03H 1/0005; G03H 1/2249; G03H 1/0443; G03H 1/2202; G06F 3/017

USPC .......................................................... 348/40
See application file for complete search history.

(56) References Cited

U.S. PATENT DOCUMENTS

| 8,500,284 | B2 | 8/2013 | Rotschild et al. |
| 2013/0278983 | A1* | 10/2013 | Sander ..................... G03H 1/26 |
| | | | 359/23 |
| 2019/0164345 | A1* | 5/2019 | Petkov .................... G06T 15/08 |

FOREIGN PATENT DOCUMENTS

DE     102012206594 A1     10/2013

OTHER PUBLICATIONS

Office Action issued in German Patent Application No. DE 10 2018 106 651.1, dated Sep. 11, 2018 and English language translation thereof.

(Continued)

*Primary Examiner* — On S Mung
(74) *Attorney, Agent, or Firm* — Falk Ewers; Ewers IP Law PLLC

(57) ABSTRACT

A visualization system includes an optical recording unit configured to capture optical signals characterizing at least one partial region of an object, a 3D reconstruction unit configured to ascertain spatial data sets, which describe the partial region of the object, based on the captured optical signals, a hologram computational unit configured to ascertain control data for producing a holographic presentation based on the spatial data sets of the partial region of the object, and a visualization unit configured to visualize a holographic presentation of the at least one partial region of the object for a user of the visualization system based on the control data. In addition, a suitable method for producing holographic presentations from optical signals is provided.

19 Claims, 5 Drawing Sheets

(56) References Cited

OTHER PUBLICATIONS

Y. Rivenson at al., "Phase recovery and holographic image reconstruction using deep learning in neural networks," Light: Science & Applications, 7, 17141, Feb. 23, 2018 (2018).
Smalley at al., "A photophoretic-trap volumetric display", Jan. 25, 2018, 486, Nature, vol. 553.

\* cited by examiner

VISUALIZATION SYSTEM AND METHOD FOR GENERATING HOLOGRAPHIC PRESENTATIONS FROM OPTICAL SIGNALS

CROSS REFERENCE TO RELATED APPLICATIONS

This application claims priority to German patent application DE 10 2018 106 651.1, filed Mar. 21, 2018, the entire content of which is incorporated herein by reference.

TECHNICAL FIELD

The present disclosure relates to a visualization system, which may include, for example, a main body of a surgical microscope, which may be a surgical microscope, or which may form a part of a surgical microscope, for example of a digital surgical microscope, for use in microsurgery, and with which holographic presentations from optical signals, recorded from an object, for example a situs or operating field of a patient, are generated. The disclosure additionally relates to a method for generating holographic presentations from optical signals.

BACKGROUND

In many areas in which microscopes are utilized, for example in surgery, and in particular in microsurgery, digital microscopes are used with increasing frequency. For example, the classical observation of a microsurgical operation using a surgical microscope (i.e., a surgical microscope having a closed optical path between the observed object, or the observed partial region, or observation region on the object, e.g., the situs of the patient) and eyepieces through which the surgeon sees, are more and more replaced by the observation using a digital monitor or digital eyepieces.

The closed optical path between situs and surgeon is separated. One or more cameras for recording the situs are provided. Optical components are generally also furthermore utilized, for example for setting zoom and focus of the camera. The optical signals recorded by the sensors of the cameras are then converted for example into digital electrical signals, and transferred to one or more digital visualization units, for example 2D-monitors for two-dimensional presentation, which allow the user, e.g., the surgeon, to observe the respective object.

In order to make the three-dimensional (3D) perception of a stereoscopic surgical microscope possible even with a digital surgical microscope, 3D monitor systems are employed which use shutters, polarization filters or autostereoscopic systems. An example is the Sony 3D 4 k monitor which is available as additional equipment for the ZEISS KINEVO 900 surgical microscope. The 3D perception can also be created by using a head-mounted display (HMD), i.e., a visual output device that is worn on the head.

However, the use of shutter or polarization filter systems requires the use of suitable glasses by the observer, which can be considered a disturbance to the observer, in particular when used for a surgical microscope system.

The use of such 3D monitors or HMDs additionally causes the vergence-accommodation conflict in the viewer, in which the eyes aim themselves onto the screen plane as an artificial depth plane in which the image is assumed to be, while the eyes remain focused on the actual focal plane which is located further away. As a result, the brain must process contradicting information. No real 3D perception occurs, because the observer accommodates to the screen plane and not, as in the observation of real 3D objects, to the different depth planes. This can lead to discomfort, dizziness, and an increased psychic stress for the observer. Due to the limited 3D perception, the selection or targeting of object positions, for example of anatomical features, at depth is made more difficult, which means that for example during an operation, moving an instrument closer to a vessel at depth requires practice.

For object presentations which are already present in the form of spatial data, U.S. Pat. No. 8,500,284 B2 describes spatial user interfaces which make it possible to provide computer-generated holograms thereof for all depth planes and to display them "substrate-less" without the use of a monitor, wherein no, or only a reduced, vergence-accommodation conflict occurs. D. E. Smalley, E. Nygaard, K. Squire, J. Van Wagoner, J. Rasmussen, S. Gneiting, K. Qaderi, J. Goodsell, W. Rogers, M. Lindsey, K. Costner, A. Monk, M. Pearson, B. Haymore & J. Peatross, "A photophoretic-trap volumetric display," Nature volume 553, pages 486-490 (Jan. 25, 2018), doi:10.1038/nature25176 also describe a spatial user interface which makes it possible to provide computer-generated holograms thereof for all depth planes and to display them "substrate-less" without the use of a monitor, wherein no, or only a reduced, vergence-accommodation conflict occurs.

The article "Deep-learning algorithm can reconstruct holograms", Light: Science & Applications, Jan. 12, 2018, additionally shows that holographic presentations can also be provide by way of artificial neural networks using appropriately trained "deep-learning methods."

SUMMARY

It is an object of the present disclosure to provide a visualization system for currently observed real objects, which permits the presentation of a three-dimensional representation of the real object in current situations, which makes precise orientation and more comfortable use possible even over relatively long periods of time.

This object is achieved by providing a visualization system, a visualization system having a superimposition mode, a method for producing holographic presentations from optical signals, and a method for visualizing holographic presentations as described herein.

In accordance with a first aspect of the disclosure, a visualization system includes an optical recording unit configured to capture optical signals characterizing at least a partial region of an object, and a visualization unit configured to visualize a holographic presentation of at least the partial region of the object for a user of the visualization system.

The visualization system additionally includes a 3D reconstruction unit configured to ascertain spatial data sets, which describe the partial region of the object, based at least on the captured optical signals, and a hologram computational unit configured to ascertain control data for producing a holographic presentation based at least on the spatial data sets of the partial region of the object, and a visualization unit configured to visualize the holographic presentation of at least the partial region of the object based on the control data.

The visualization system thus permits the recording of optical signals, for example of images or video signals, of an observed object or of a partial region thereof, for example of the situs or operating field of the patient when used during surgery. Provision is made here for a three-dimensional holographic presentation of the partial region of the currently observed object, for example in the case of an operation of a current operation situs, to be displayed to the user, for example the surgeon, using a visualization unit that includes a "substrate-free" holographic display rather than a monitor. For example, the visualization system can thus be a system for holographic visualization of the image data of a digital microsurgical surgical microscope. The use, including for example in the field of neurosurgery or ophthalmology, is likewise possible.

A "partial region" can include a proportion of the object or even the entire object and designates, depending on the recording or analysis technology used or the combination of different technologies used, a partial region of the surface and/or of a volume of the object.

An optical recording unit includes at least one optical sensor, for example a camera sensor, and can also include a plurality of optical sensors, for example two camera sensors for stereoscopic recordings of the observed partial region of the object, for example for the left and the right channel of a (digital) surgical microscope. The optical sensors receive light in the visible range. Alternatively or additionally, provision can also be made for the reception of light in the infrared range. The optical recording unit can also include depth sensors or can be combined with an optical coherence tomography (OCT) scanner for coherence tomography scans or a time-of-flight sensor.

Due to the use of a visualization unit including a "substrate-free" holographic display rather than a monitor, the occurrence of the accommodation-vergence conflict can be avoided, in contrast to the use of conventional 3D monitors. To this end, the hologram computational unit, which may be a programmable apparatus having a processor and a memory, generates the control data for producing the holographic presentation, which is thus a computer-generated hologram (CGH).

The spatial data sets, which are required for the computation and which describe the positions for example of the object points of the partial region to be presented in space, are for this purpose generated by the 3D reconstruction unit from the optical signals recorded by the optical recording unit. The spatial data sets can be in particular topographical data that describe the 3D surface of the partial region to be presented and that are ascertained for example from stereoscopic recordings recorded by the optical recording unit. Holographic presentation is then effected based on a topographic reconstruction of the surface of the partial region of the object. Additionally, the spatial data sets can be voxel data, which are ascertained using a corresponding recording system which provides volume information, for example an OCT scanner as the optical recording unit or a part thereof, and from which the topographical information is able to be generated, too. Consequently, a 3D reconstruction is effected of the partial region of the object to be presented, for example the situs, with respect to the surface or volume thereof. Rather than, for example, presenting images or video streams directly (e.g., on a 3D monitor), data sets suitable for a 3D representation are initially determined, with which then any desired views which correspond to the distance of the hologram from the viewer (e.g., the surgeon) can be calculated and correctly displayed in the hologram, thereby taking into account both accommodation and vergence.

In other words, rather than directly using the optical signals captured by the optical recording unit as a basis for generating a two-dimensional or three-dimensional imaging of the observed partial region of the object (e.g., by converting the image data streams of the stereoscopic recordings of the left and right channel of a (digital) surgical microscope directly into a left and right view, presented for example on a 2D or 3D screen, of the observed partial region of the object, for example the situs of a patient), provision is made in the visualization system according to the disclosure for spatial data sets which describe the partial region of the object and form a 3D reconstruction of the partial region of the object to initially be calculated from the optical signals (from these image data) recorded by the optical recording unit. The 3D reconstruction presents in particular a reconstruction of the surface for which a topography of the surface is calculated, that is to say a surface model of the surface. Depending on the recording method, the topographic information in the form of surface data or volume data in the form of voxel data, from which the topographical information can also be obtained, is to this end calculated as spatial data sets, i.e., as spatial data.

The topographic information in the form of spatial data, which thus represent a surface model of the surface, offers the advantage that the topographic information form "holographic data" (hologram data) and are presentable in space, with the result that the hologram computational unit can determine, based on this representation, the control data with which the visualization unit is actuated in order to visualize the associated holographic presentation for the user.

In contrast to the presentation on a screen, said holographic data can advantageously also be viewed from a different viewing direction (for example from the side).

According to a further aspect of the disclosure, in the holographic view, the directional reference (front/rear or top/bottom) is clear to the observer. Other visualization systems, for example 3D observation systems, can, for example owing to divergence, exhibit the effect that this directional reference (front/rear etc.) appears inverted for an observer, for example because the focal point is at the wrong location.

The latency times between image recording and display of the holographic presentation are typically kept low. When using a digital surgical microscope for the 3D reconstruction unit, the hologram computational unit and also the visualization unit are integrated in the surgical microscope system or realized with connections with guaranteed latency times.

In an exemplary embodiment of the visualization system, the optical recording unit, the 3D reconstruction unit, the hologram computational unit, and the visualization unit are configured to continuously update the optical signals, the spatial data sets, the control data, and the holographic presentation in a live mode. To enable a comfortable use as a working instrument, for example to support an operation, a holographic presentation of the currently recorded partial region of the object or situs is available to the user/surgeon in live mode in real time typically at all times or with an update rate or latency time that is not perceived by the user. As a result, each work step on the object can be checked in real time on the basis of the holographic presentation. The optical signals therefore do not only supply image data of the object, but at least one image stream or video which shows the instantaneous current situation and is or are used to visualize a holographic presentation in real time, wherein to this end the live mode permits real-time realization of the entire data chain from the recording of the optical signals, via the creation of the spatial data sets and the generation of the control data, to the production of the holographic presentation.

In an exemplary embodiment, the holographic presentation is updated at intervals of less than 150 milliseconds (ms), typically in 80 ms or less, in particular within 50 ms or less, and ideally within 40 ms or less, so that an update which is perceivably as disturbance-free as possible permits comfortable use of the visualization system. In order to realize the required low latency in the data chain with continuous updating of the optical signals, of the spatial data sets, of the control data, and of the holographic presentation, real-time-capable or low-latency algorithms and hardware can be used to permit the holographic presentation to be updated at these small intervals. Graphics cards, field-programmable gate arrays (FPGAs), application-specific integrated circuits (ASICs) or performance CPUs can be used for this purpose. It is also possible to parallelize the algorithms for example by using the compute unified device architecture (CUDA), or an OpenCL or open multi-processing (OpenMP) architecture. For example, real-time capable algorithms from existing libraries, for example OpenCV, Intel IPP or ITK, and/or proprietary algorithms can be used.

In an exemplary embodiment, the spatial data sets include surface data elements or voxel data elements with a color information component. In a Cartesian coordinate system, a surface data element or a voxel data element is therefore represented as a (x, y, z, color)-tuple, wherein other presentations, for example in angular coordinates or relative statements with respect to other tuples, are possible. As opposed to other methods which, although they are imaging methods, are not visibly image-recording methods, such as ultrasound methods, the use of optical signals makes possible the color-accurate imaging of the topography, that is to say of the surface profile, of the observed partial region of the object, for example of the situs. Creating the 3D representation, for example, of the topography as data sets, based on surface data elements, with color information component or from voxel-based data sets also makes fast computational generation of any desired views with respect to distance and vergence possible, which can be correctly displayed in color in the hologram. The color information component here represents the assigned color and is differently represented depending on the color space used, for example RGB, and can, according to an exemplary embodiment, also include "opacity information," for example the alpha value in the RGBA color space.

In a further exemplary embodiment, the spatial data sets include surface data elements or voxel data elements having an opacity information component independent from the combination with a color presentation, that is to say also in combination with a grayscale presentation. In this exemplary embodiment, the data elements of the spatial data sets are connected to one with an opacity information, or "alpha value."

In a further exemplary embodiment, the recording unit is configured to capture distance information assigned to the optical signals.

While depth information or distance information between the recorded object and the recording unit can in principle also be generated from the recorded images or image sequences (for example in stereoscopic reconstruction from recordings of a stereo camera or the image data of a left and right channel of a (digital) surgical microscope), the optical recording unit may be equipped with a topography sensor to obtain assigned distance information for each recorded item of image information in order to increase accuracy in the distance determination. For example, a time-of-flight (ToF) sensor may be used, in which in each case the distance from the surface is determined using a time-of-flight method. Technologies which use for example structural illumination or depth-from-defocus methods can also be used. Here, all camera sensors of the optical recording unit can be configured to capture the distance information, for example by using an assigned ToF sensor. In stereo camera systems, the topography captured using a ToF sensor with respect to one camera can be superimposed on the texture recorded with a different camera.

In an exemplary embodiment, the hologram computational unit includes means for computationally producing stereo views from the spatial data sets. To create a perfect three-dimensional perception of the holographic presentation, the correct view is projected by the visualization unit into each eye of the observer. Since the total data of the recorded partial region of the object are present in the form of spatial data sets, it is also easily possible to generate herefrom any required stereo view in real time, with the result that the accommodation-vergence conflict does not occur, even if the holographic presentation is observed over a relatively long time, for example the duration of an operation.

In an exemplary embodiment, the means for computationally producing stereo views from the spatial data sets are configured to generate the stereo views in a manner such that they are adapted to a pupillary distance of the user of the visualization system.

In another exemplary embodiment, the main body of the surgical microscope of the visualization system includes an optical recording unit or a part thereof. The visualization system can be, for example, a digital surgical microscope or form a part thereof, wherein the surgical microscope includes at least one main objective and image sensors and possibly a magnification changer, such as, for example, a zoom system or a Galilean changer. While in other cases there is also the possibility of performing a zoom in the holographic presentation by presenting it in magnified fashion or by adapting the data of the 3D reconstruction for an increased presentation, the use of the magnification changer of a microscope permits real optical magnification of a selected region of the observed partial region of the object, that is to say for example of the situs, with the result that a 3D reconstruction and therefrom a holographic presentation can be generated, which visualizes the magnified region without a loss in resolution.

In one exemplary embodiment, the visualization system additionally includes an augmentation unit, which has means for superimposing additional data on the spatial data sets. The hologram computational unit is configured to ascertain the control data for producing the holographic presentation based on the spatial data sets on which the additional data are superimposed. In this way, a holographic presentation which also visualizes the additional data is generated.

If the partial region of the object that is to be holographically presented is the situs of a patient, the additional data can be, for example, ultrasound data or other data, for example data obtained pre-operatively by computed tomography (CT) or magnetic resonance tomography (MRT), or navigation data, and/or also data obtained intraoperatively, for example digital biopsy data. The additional data are superimposed on the spatial data sets and in this way integrated in the holographic presentation which is generated on this basis. The additional data can here include two-dimensional or three-dimensional information, for example images, contours, graphics, or text information. There exists an imaging specification, i.e., a registration, for superimposing the additional data, for example based on voxel data or surface or tomography data presentation, and the spatial data sets which represent the primary visualization data.

In an exemplary embodiment, the visualization system includes an interaction capturing unit having means for capturing an interaction of the user of the visualization system with the holographic presentation. The interaction can be, for example, in the form of gestures of at least one hand or of one or more fingers of the user, but also using a tool, for example a pointing device. The interaction can also take place for example by way of head movements or changes in the viewing direction. Provided as a means for capturing the interaction is for example at least one camera for recording the user in connection with a programmable apparatus that performs a suitable tracking analysis program to recognize the gestures of the user and to cause the visualization system to perform the action that is assigned to said gesture. In addition or alternatively, other interaction possibilities may also be provided, for example an interaction via voice commands, for which at least one microphone and correspondingly suitable voice recognition software are provided as means.

The interaction can cause a change in the holographic presentation, for example zooming or magnification. Other examples of interactions are a rotation and/or tilting of the holographic presentation.

In an exemplary embodiment, the visualization system additionally includes an interaction control unit which is configured to control the recording unit in response to the interaction of the user with the holographic presentation.

The zoom into the holographic presentation, for example to study detail structures, can be effected digitally, wherein the already rendered holographic presentation is illustrated in magnified form, or optically, when the optical recording unit, for example a microscope, makes provision of an optical magnification changer, wherein the magnification by way of the optical recording unit permits magnification with constant high resolution. For the optical zoom, the interaction control unit transmits a corresponding signal to the microscope, which causes the optical adaptation of the magnification, for example by displacing lenses.

The interaction control unit controls the optical recording unit in regard to the recording settings thereof, for example by changing the magnification and/or focus settings, but also in regard to the position and orientation thereof, depending on the exemplary embodiment. The interaction of the user, who may move, rotate or manipulate the holographic presentation in a different way, for example directly by using their hands, causes the interaction control unit to control the optical recording unit and/or possibly also the positioning apparatus thereof, for example a robotic stand of a surgical microscope. For example, a robotic stand with the optical recording unit is correspondingly adjusted depending on the movement of the holographic presentation. Tilting of the holographic presentation about an axis is thus transferred to the corresponding axis of the optical recording unit, or of the microscope. In a further exemplary embodiment, the "touching" of a point in the holographic presentation causes the interaction control unit to control the optical recording unit to focus the corresponding point on the object. In an exemplary embodiment, the region on which an optical zoom is to occur is defined by a gesture. To this end, the corresponding region in the holographic presentation that is covered with the fingers is recorded by the optical recording unit (zoom function).

In a further exemplary embodiment, the visualization system additionally includes an interaction control unit which is configured to control the hologram computational unit in response to the interaction of the user with the holographic presentation. For example, provision may be made for opacity values to be appropriately adapted.

In a further exemplary embodiment, the visualization system includes means for adapting an orientation of the holographic presentation to an orientation of the user with respect to the partial region of the object for which the holographic presentation is generated.

In the case of an operation, for allowing optimum hand-eye coordination for the surgeon, the orientation of the holographic presentation for typically corresponds to the orientation between the surgeon and the situs, or patient. Since the optical recording unit, which is, for example, part of a surgical microscope, has rotational degrees of freedom, i.e., it can be rotated, the orientation of the holographic presentation can be variably adapted. To this end, a camera and corresponding image analysis software are used to determine the viewing direction, position, or shoulder line of the surgeon relative to the situs or patient and to the surgical microscope, and to correspondingly adapt the orientation of the holographic presentation. In an exemplary embodiment, for determining the orientations, marker-based or markerless adjustment methods are used.

In an exemplary embodiment, the visualization unit is configured to display, in a first visualization mode, the holographic presentation of the partial region of the object in a manner such that it appears to the user as if it were freely floating in space. This offers, for example, the advantage that the user can interact freely with the holographic presentation, for example to manipulate it.

In a further exemplary embodiment, the visualization unit is set up to display, in a second visualization mode, the holographic presentation of the partial region of the object in a manner such that it appears to the user as if it were superimposed on the partial region of the object. For this "registered" mode, a corresponding imaging specification (registration) exists for adapting the holographic presentation exactly to the position and orientation of the object. For example, the real position of the situs and steps to be performed can be planned during or even before an operation, for example also taking into account any available superposable additional data.

In particular, provision can also be made for example, for additional data, which have been added by the augmentation unit, to be superimposed only in one of the visualization modes, for example only in the second visualization mode.

Provision can also be made, in the second visualization mode, for a zoomed presentation, which is shown in the first mode, to be presented in the second mode without the zoom, with the result that in one mode, an enlarged presentation is shown, but in the other mode, the presentation that is adapted exactly to the true size of the real object or situs is shown.

For example, the holographic presentation of the situs can be shown during an operation either to be freely floating in space or in register and superimposed with respect to the real patient (real size), wherein, in the first visualization mode, or "floating" mode, said presentation is shown for example with a greater magnification than in the second visualization mode, or "registered" mode.

In an exemplary embodiment, the visualization unit is configured to switch between the first visualization mode and the second visualization mode depending on an input by the user. The input by the user can also in this case be provided for example via the interaction capturing unit. The input can consist of a gesture, a change in viewing direction, a voice command, and also of a push of a button. In an exemplary embodiment, a switch between these two visualization modes "floating" and "registered" is controlled by lowering and lifting the head.

In an exemplary embodiment, the visualization system includes at least one further optical recording unit having further means for capturing further optical signals characterizing at least one environment region of the object. In this way it is possible, in addition to the recording of the optical signals for producing a holographic presentation of the partial region of the object, to also record signals that allow the likewise holographic presentation of the environment or at least parts thereof. This offers for example the advantage that work processes can be performed more efficiently using the visualization system because switching between working with the holographic presentations and the real environment is reduced. For example, when using a surgical microscope with a visualization system and generating spatial data sets in the form of surface or topography data or voxel data in this multimodal presentation, the microscope generates a stream of spatial data, which includes substantially (enlarged) data of the situs. In addition, one or more further optical recording units distributed in the operating room can then generate optical signals with respect to the operating room. These optical recording units are typically configured to capture the direct surrounding area of the microscope, for example up to 1 $m^3$, and for example of the entire operating room, for example up to 100 $m^3$. Separately or together, further 3D reconstructions are determined from these optical signals, and control data for holographic presentations are determined from the associated spatial data. The direct surrounding area of the microscope can here typically be used for gesture control and for tool tracking, and the operating room surrounding area can be used for measuring the position of people and devices. It is possible, due to this multimodal 3D reconstruction and presentation, to show, in addition to the enlarged situs, the surrounding area, for example a sterile table with the instruments. A switch between the holographic presentations can then be effected for example by way of an appropriate input by the surgeon or automatically, for example controlled by a head movement.

In a still further exemplary embodiment, the visualization system includes at least one further visualization unit for visualizing the holographic presentation for a further user. In this way, a holographic presentation for a further user, for example a further surgeon or an assistant, can always be made possible from the correct observer perspective, because the latter is determinable from the spatial data sets ascertained during the 3D reconstruction, but otherwise an individual visualization unit can be made possible which makes provision for example for stereo images, which were generated from the 3D reconstruction, to be projected correctly into the eyes of the observer, but performs this possibly only for in each case one observer at the same time.

In a visualization system, different optical recording units can be used, possibly also in combination with each other.

In an exemplary embodiment, the optical signals include stereoscopic image data of the partial region of the object. In the live mode, these are correspondingly sequences of stereoscopic images, i.e., of stereoscopic video data. To this end, for example, in a visualization system which is part of a surgical microscope, stereoscopic video data of the situs can be recorded under white light and/or fluorescence using cameras that are integrated in the surgical microscope.

From these, a 3D reconstruction will then be calculated by the 3D reconstruction unit. To this end, in an exemplary embodiment, a topographic reconstruction of the recorded partial region of the object, e.g., of the situs, is performed, i.e., the topography of the surface is reconstructed. To this end, for example a method of the semi-global block matching or another known method for stereoscopic or topographic reconstruction can be used. In order to generate geometrically correct data, the optical recording unit is to this end calibrated both extrinsically and intrinsically for different zoom and focus settings. The result obtained is the "surface landscape" of the situs with texture. Moreover, it is also possible for distance determination to use distance sensors, for example a ToF Sensor.

In a further exemplary embodiment of the visualization system, the optical signals include OCT scans of the partial region of the object. In a surgical microscope, it is possible for recording corresponding optical signals to use an OCT scanner which is also already integrated in the surgical microscope in an exemplary embodiment. In this way, a real-time 3D reconstruction can already take place in the computational unit of the OCT scanner. The system is here calibrated, too, to generate geometrically correct data. In contrast to the stereoscopic reconstruction which provides a description of the topography of the surface of the corresponding partial region of the object, a volume data set is generated in the case of the OCT. The topographic surface can then also be calculated from this volume data set.

In a still further exemplary embodiment of the visualization system, the optical signals include endoscopic recordings of the partial region of the object. The optical recording unit used can be a stereoscopic or monoscopic endoscopic system. The image or video data of stereoscopic endoscopic systems can be used, like other stereoscopic image and video data, for calculating the topography of the recorded surface.

If a monoscopic endoscopic system is used, the topography can be determined in real time for example with structure-from-motion calculation methods or methods for simultaneous localization and mapping (SLAM).

In a still further exemplary embodiment, the visualization system additionally includes a non-optical recording unit, which is configured to capture non-optical signals characterizing at least a proportion of the partial region of the object. The 3D reconstruction unit is configured to ascertain spatial data sets, which describe the partial region of the object, based also on the captured non-optical signals. The non-optical recording unit can be for example and in particular in the live mode a recording unit for ultrasound signals. The recording unit can be for example a hand-held ultrasound probe, which provides ultrasound signals, preoperatively and/or intraoperatively, either in 2D or 3D. The associated data are captured in register with the data which are based on the optical signals. Further recording units can be determined for the, in particular preoperative, recording of MRT and/or CT volume data.

In accordance with a further aspect of the disclosure, a visualization system with a superimposition mode includes an optical recording unit configured to capture optical signals characterizing at least a partial region of an object, and a visualization unit configured to visualize a holographic presentation for a user of the visualization system with superimposition mode. The visualization unit with superimposition mode is here configured to display the holographic presentation such that it appears to the user in a manner in which it is superimposed on the partial region of the object. The partial region of the object can be in particular the (operation) situs of a patient during an operation.

The holographic presentation is here for example generated in accordance with an exemplary embodiment described with respect to the first aspect of the disclosure. For example, it can include a holographic presentation of the partial region of the object, of augmentation information, or a combination thereof, displayed in register, that is to say adapted to the position and orientation of the partial region of the object, that is to say, for example, superimposed on the (operation) situs. However, the holographic presentation can also be generated from other data than the data coming from the optical recording unit, for example, the holographic presentation can be generated from preoperatively obtained CT or MRT data, from navigational data and/or from intra-operative data. The holographic presentation is then registered with the data obtained using the optical recording unit and superimposed on the partial region of the object.

According to a further aspect of the disclosure, a method for producing holographic presentations from optical signals includes, in a first step, capturing optical signals characterizing at least a partial region of an object. In a second step, the method includes ascertaining spatial data sets, which describe the partial region of the object, based at least on the captured optical signals. In a third step, the method includes ascertaining control data for producing a holographic presentation based at least on the spatial data sets of the partial region of the object, and, in a fourth step, visualization of the holographic presentation of at least the partial region of the object based on the control data. In this way, the advantages and special features of the visualization system according to the aspect of the disclosure are also implemented in the context of a method for producing holographic presentations from optical signals.

In an exemplary embodiment, the method additionally includes a further step of superposing the spatial data sets with additional data, wherein the ascertaining of control data for producing the holographic presentation includes ascertaining the control data based on the spatial data sets on which the additional data are superposed.

In an exemplary embodiment, the method includes, in a live mode, continuously updating the optical signals, the spatial data sets, the control data, and the holographic presentation.

In an exemplary embodiment of the method, provision is made for updating of the holographic presentation at intervals of less than 150 ms, typically in 80 ms or less, with particular preference within 50 ms or less, and ideally within 40 ms or less, so that the update is done perceivably as disturbance-free as possible.

According to a further aspect of the disclosure, a method for visualizing holographic presentations includes capturing optical signals characterizing at least a partial region of an object and visualizing a holographic presentation for a user of a visualization system with superimposition mode, wherein the holographic presentation is displayed such that it appears to the user as if it were superimposed on the partial region of the object. In this way, advantages and special features of the visualization system with superimposition mode according to the aspect of the disclosure are also implemented in the context of a method for visualizing holographic presentations.

BRIEF DESCRIPTION OF THE DRAWINGS

The disclosure will now be described with reference to the drawings wherein.

DESCRIPTION OF EXEMPLARY EMBODIMENTS

The disclosure will be explained in more detail below in conjunction with the following description of exemplary embodiments, with reference being made to the attached drawings. The explanation of the visualization system is given here by way of example starting from a surgical microscope, which is described first.

It is understood that other exemplary embodiments can be used and structural or logical modifications can be undertaken without departing from the scope of protection of the present disclosure. It is understood that the features of the various exemplary embodiments explained above and below can be combined with one another, provided that there is no specific statement to the contrary. Therefore, the description should not be considered to be limiting.

Figure 1:
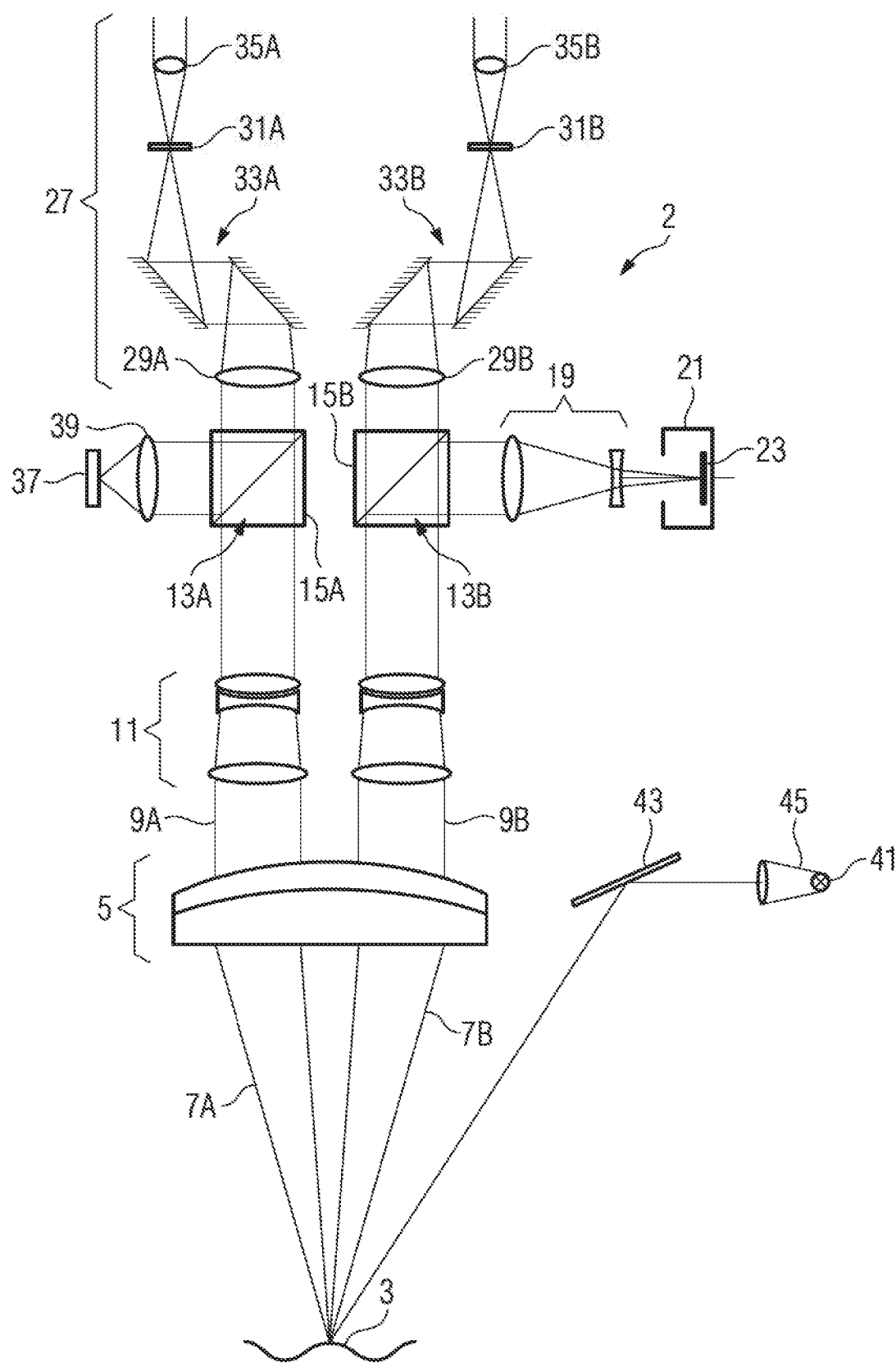
FIG. 1 shows a schematic illustration of typical optical components of a surgical microscope.

The surgical microscope 2 shown in FIG. 1 includes as optical components an objective 5 facing an object field 3. The objective 5 can be embodied as an achromatic or apochromatic objective. In the exemplary embodiment shown in FIG. 1, the objective 5 consists of two partial lenses which are cemented to one another and which form an achromatic objective. In the case of an apochromatic objective, at least three partial lenses are present. The object field 3 is arranged in the focal plane of the objective 5 such that an observation object located in the object field 3 is imaged at infinity by the objective 5. Expressed differently, a divergent beam 7 emanating from the object field 3 is converted into a parallel beam 9 during its passage through the objective 5.

A magnification changer 11 is arranged on the observer side of the objective 5. The magnification changer can be embodied either as a zoom system configured to change the magnification factor in a continuously variable manner as in the illustrated exemplary embodiment, or as what is known as a Galilean changer configured to change the magnification factor in a stepwise manner. In a zoom system, constructed by way of example from a lens combination having three lenses, the two object-side lenses can be displaced in order to vary the magnification factor. In fact, however, the zoom system also can have more than three lenses, for example four or more lenses, in which case the outer lenses then can also be arranged in a fixed manner. In a Galilean changer, by contrast, there are a plurality of fixed lens combinations which represent different magnification factors and which can be introduced into the beam path alternately. Both a zoom system and a Galilean changer convert an object-side parallel beam into an observer-side parallel beam having a different beam diameter.

In the present exemplary embodiment, the magnification changer 11 is already a part of the binocular beam path of the surgical microscope 2, i.e., it has a dedicated lens combination for each stereoscopic partial beam path 9A, 9B of the surgical microscope 2. However, it is also possible in principle to use a "large magnification changer," i.e., a magnification changer in which both stereoscopic partial beam paths pass through each lens.

In the exemplary embodiment, a magnification factor is adjusted by the magnification changer 11 by a motor-driven actuator which, together with the magnification changer 11, is part of a magnification changing unit configured for adjusting the magnification factor.

The magnification changer 11 is adjoined on the observer side by an optical interface arrangement 13A, 13B, by which external appliances can be connected to the surgical microscope 2 and which includes beam splitter prisms 15A, 15B in the exemplary embodiment. However, in principle, use can also be made of other types of beam splitters, for example partly transmissive mirrors. In the exemplary embodiment, the optical interfaces 13A, 13B serve to couple a beam out of the beam path of the surgical microscope 2 (beam splitter prism 15B) and/or to couple a beam into the beam path of the surgical microscope 2 (beam splitter prism 15A).

In the exemplary embodiment, the beam splitter prism 15A in the partial beam path 9A serves to mirror information or data for an observer into the partial beam path 9A of the surgical microscope 2 with the aid of a display 37, for example a digital mirror device (DMD) or a liquid-crystal-display (LCD), and an associated optical unit 39 by the beam splitter prism 15A. FIG. 1 further shows a camera adapter 19 with a camera 21 fastened thereto. The camera is equipped with an electronic image sensor 23, for example with a charge-coupled device (CCD) sensor or a complementary metal-oxide semiconductor (CMOS) sensor, is arranged at the interface 13B in the other partial beam path 9B. It is possible to record an electronic image and, in particular, a digital image of the object field 3 with the camera 21.

The interface 13 is formed on the observer side by a binocular tube 27. The latter has two tube objectives 29A, 29B, which focus the respective parallel beam 9A, 9B onto an intermediate image plane 31, i.e., image the object field 3 onto the respective intermediate image planes 31A and 31B. The intermediate images located in the intermediate image planes 31A and 31B are finally imaged at infinity in turn by eyepiece lenses 35A and 35B, such that an observer can observe the intermediate image with a relaxed eye. Moreover, an increase in the distance between the two partial beams 9A and 9B is effectuated in the binocular tube by a mirror system or by prisms 33A and 33B in order to adapt said distance to the interocular distance of the observer. In addition, image erection is carried out by the mirror system or the prisms 33A and 33B.

The surgical microscope 2 is equipped with an illumination apparatus, by which the object field 3 can be illuminated with illumination light. To this end, the illumination apparatus has a white-light source 41, for example a halogen lamp or a gas discharge lamp, in the exemplary embodiment. The light emanating from the white-light source 41 is directed in the direction of the object field 3 via a deflection mirror 43 or a deflection prism in order to illuminate said field. Furthermore, an illumination optical unit 45 is provided in the illumination apparatus, said illumination optical unit ensuring uniform illumination of the entire observed object field 3.

Reference is now made to the fact that the illumination beam path illustrated in FIG. 1 is highly schematic and does not necessarily reproduce the actual course of the illumination beam path. In principle, the illumination beam path can be embodied as a so-called oblique illumination, which comes closest to the schematic illustration in FIG. 1. In such oblique illumination, the beam path extends at a relatively large angle (6° or more) with respect to the optical axis of the objective 5. As illustrated in FIG. 1, the beam path may extend completely outside the objective. Alternatively, however, there is also the possibility of allowing the illumination beam path of the oblique illumination to extend through a marginal region of the objective 5. A further option for the configuration of the illumination beam path is what is known as 0° illumination, in which the illumination beam path extends through the objective 5 and is coupled into the objective 5 between the two partial beam paths 9A, 9B, along the optical axis of the objective 5 in the direction of the object field 3. Finally, it is also possible to embody the illumination beam path as a so-called coaxial illumination, in which a first illumination partial beam path and a second illumination partial beam path are provided. The partial beam paths of the illumination beam path are coupled into the surgical microscope in a manner parallel to the optical axes of the observation partial beam paths 9A, 9B by way of one or more beam splitters such that the illumination extends coaxially in relation to the two observation partial beam paths.

In the exemplary embodiment of the surgical microscope 2 shown in FIG. 1, the objective 5 consists only of an achromatic lens. However, use can also be made of an objective lens system made of a plurality of lenses, in particular of a so-called varioscope objective, by which it is possible to vary the working distance of the surgical microscope 2, i.e., the distance between the object-side focal plane and the vertex of the first object-side lens surface of the objective 5, also referred to as front focal distance. The object field 3 arranged in the focal plane is imaged at infinity by the varioscope objective 50, too, and so a parallel beam is present on the observer side.

Figure 2:
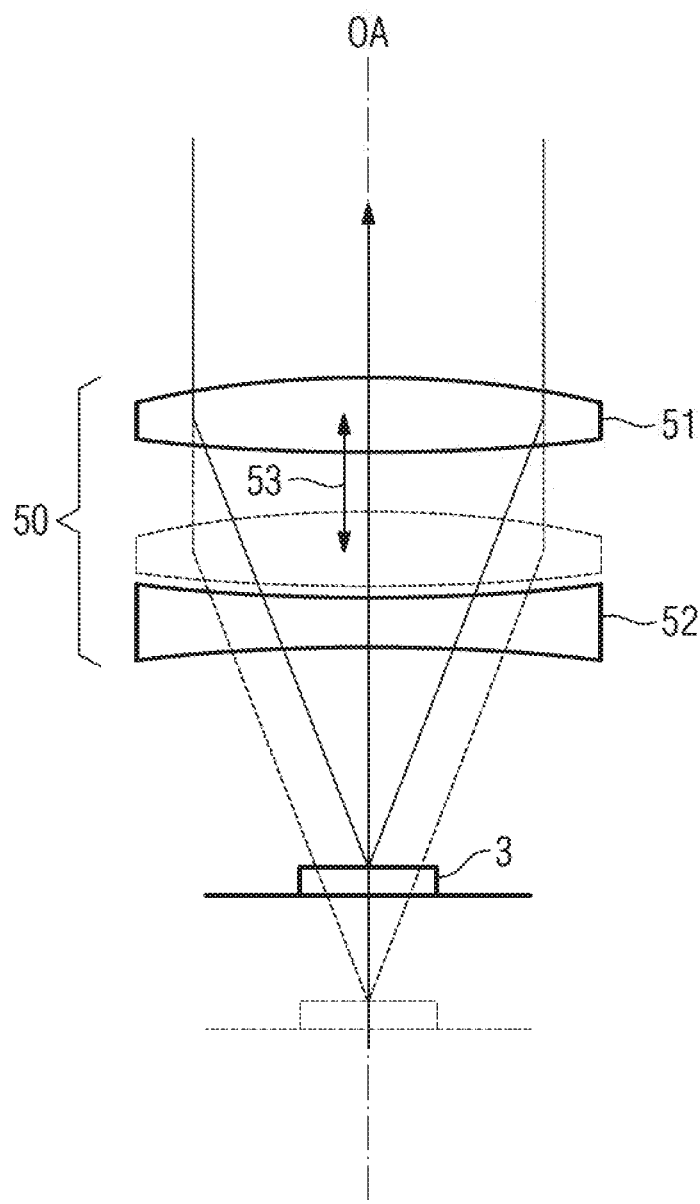
FIG. 2 shows a schematic illustration of a varioscope objective.

One exemplary embodiment of a varioscope objective is illustrated schematically in FIG. 2. The varioscope objective 50 includes a positive member 51, i.e., an optical element having positive refractive power, which is schematically illustrated as a convex lens in FIG. 2. Moreover, the varioscope objective 50 includes a negative member 52, i.e., an optical element having negative refractive power, which is schematically illustrated as a concave lens in FIG. 2. The negative member 52 is located between the positive member 51 and the object field 3. In the illustrated varioscope objective 50, the negative member 52 has a fixed arrangement, whereas, as indicated by the double-headed arrow 53, the positive member 51 is arranged to be displaceable along the optical axis OA. When the positive member 51 is displaced into the position illustrated by dashed lines in FIG. 2, the back focal length increases, and, as a result, there is a change in the working distance of the surgical microscope 2 from the object field 3.

Even though the positive member 51 has a displaceable configuration in FIG. 2, it is also possible, in principle, to arrange the negative member 52 to be movable along the optical axis OA instead of the positive member 51. However, the negative member 52 often forms the last lens of the varifocal objective 50. A stationary negative member 52 therefore offers the advantage of making it easier to seal the interior of the surgical microscope 2 from external influences. Furthermore, it is noted that, even though the positive member 51 and the negative member 52 in FIG. 2 are only illustrated as individual lenses, each of these members may also be realized in the form of a lens group or a cemented element instead of in the form of an individual lens, for example to embody the varioscope objective to be achromatic or apochromatic.

Figure 3:
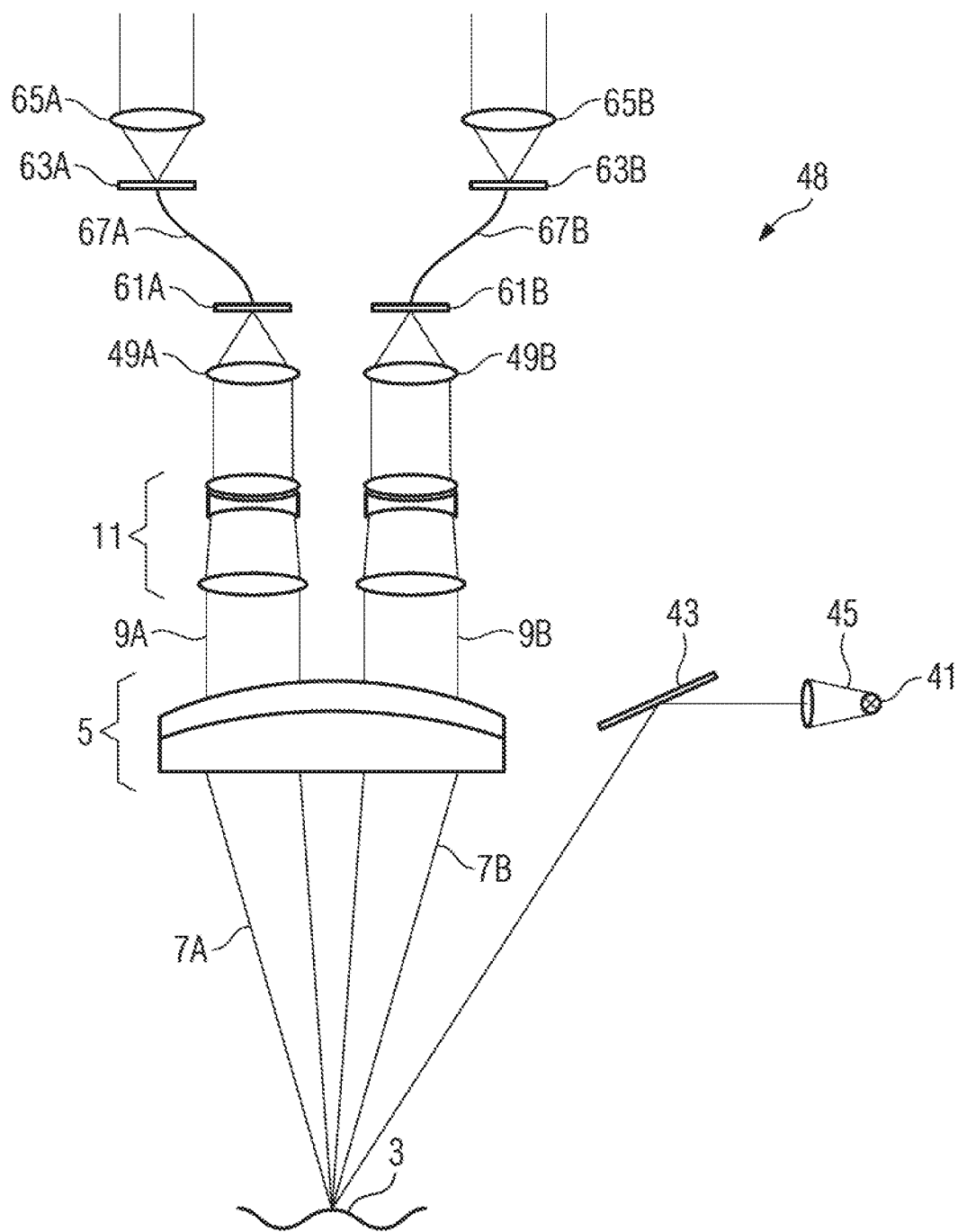
FIG. 3 shows the surgical microscope shown in FIG. 1, but configured as a digital surgical microscope.

FIG. 3 shows a schematic illustration of an exemplary embodiment of a digital surgical microscope 48. In this surgical microscope, the main objective 5, the magnification changer 11 and the illumination system 41, 43, 45 do not differ from the surgical microscope 2 with the optical view that is illustrated in FIG. 1. The difference lies in the fact that the surgical microscope 48 shown in FIG. 3 does not include an optical binocular tube. Instead of the tube objectives 29A and 29B shown in FIG. 1, the surgical microscope 48 shown in FIG. 3 includes focusing lenses 49A and 49B, by which the binocular observation beam paths 9A and 9B are imaged onto digital image sensors 61A and 61B. Here, the digital image sensors 61A and 61B can be, e.g., CCD sensors or CMOS sensors. The images recorded by the image sensors 61A and 61B are transmitted digitally to digital displays 63A and 63B, which may be embodied as light emitting diode (LED) displays, as LCD displays or as displays based on organic light-emitting diodes (OLEDs). Like in the exemplary embodiment, eyepiece lenses 65A and 65B can be assigned to the displays 63A and 63B, by which the images displayed on the displays 63A and 63B are imaged at infinity such that an observer can observe said images with relaxed eyes. The displays 63A, 63B and the eyepiece lenses 65A, 65B can be part of a digital binocular tube; however, they can also be part of a head-mounted display (HMD) such as, e.g., a pair of smartglasses.

Even though FIG. 3, like FIG. 1, only illustrates an achromatic lens 5 with a fixed focal length, the surgical microscope 48 shown in FIG. 3 may include an apochromatic objective or a varioscope objective instead of the achromatic lens 5, like the surgical microscope 2 illustrated in FIG. 1. Furthermore, FIG. 3 shows a transfer of the images recorded by the image sensors 61A and 61B to the displays 63A and 63B by cables 67A and 67B. However, instead of utilizing a wired communication, the images can also be transferred wirelessly to the displays 63A and 63B, especially if the displays 63A and 63B are part of a head-mounted display.

Figure 4:
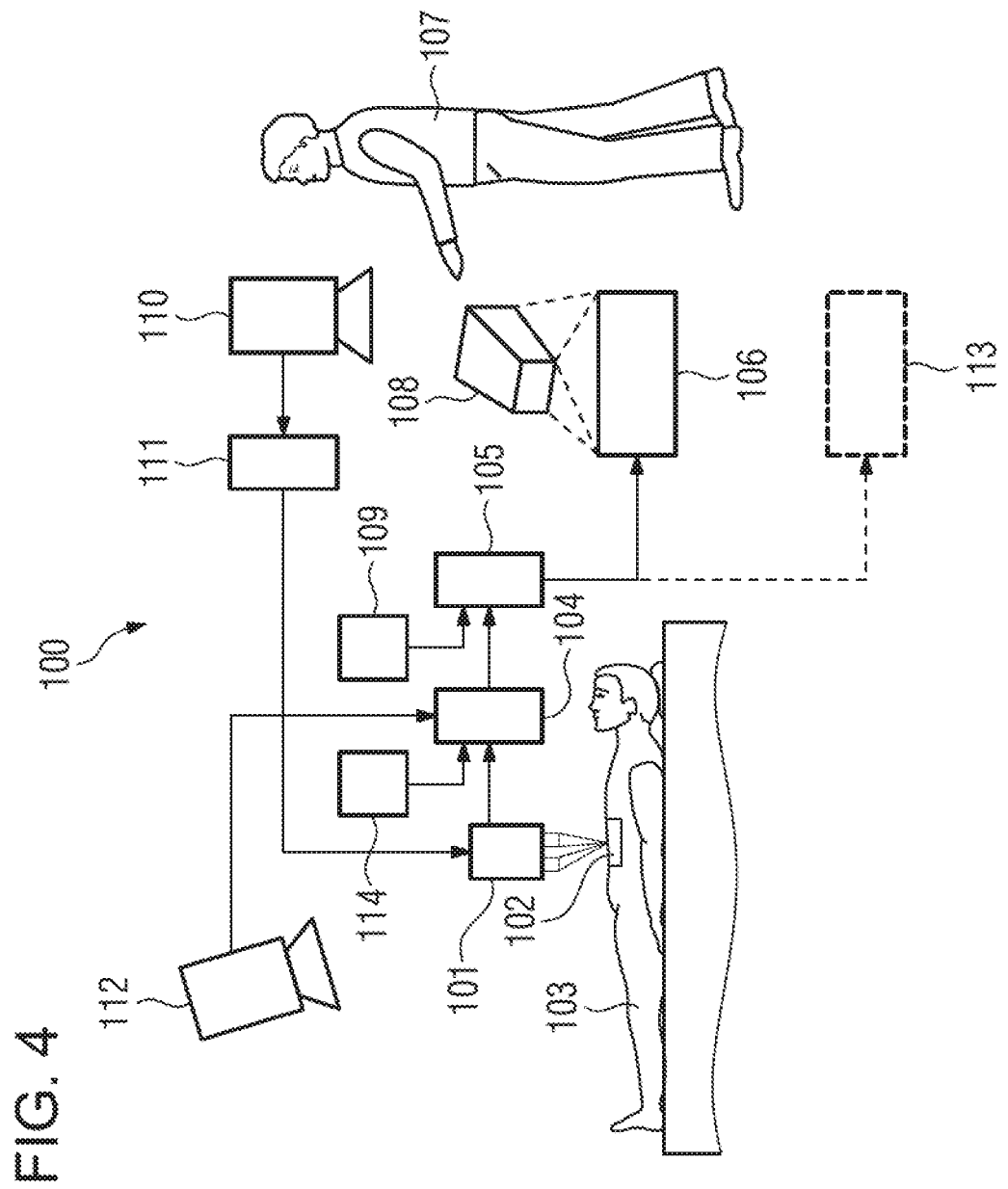
FIG. 4 shows a schematic illustration of an exemplary embodiment of a visualization system according to an exemplary embodiment of the disclosure.

FIG. 4 shows a schematic illustration of an exemplary embodiment of a visualization system according to an exemplary embodiment of the disclosure. In the exemplary embodiment shown in FIG. 4, the visualization system 100 is configured based on a digital surgical microscope. The visualization system 100 includes an optical recording unit 101. The optical recording unit 101 is used to record optical signals as digital images or videos of the partial region 102 of an object 103 that is to be observed. In the application shown, the shown object 103 is the patient and the partial region 102 of the object is, or includes, the situs, that is to say the operating field or object field. The optical recording unit 101 in the exemplary embodiment shown in FIG. 4 corresponds for example to the main body of a digital stereoscopic surgical microscope and therefore includes at least the main objective thereof, the magnification changer, and the image sensors, with the result that optical magnification can be performed. For example, it can include the main body of the digital surgical microscope 48 shown in FIG. 3, wherein the optical signals which are recorded in the form of digital images by the image sensors 61A and 61B shown there are not supplied via the cables 67A and 67B to the digital displays 63A and 63B, but are transferred to a 3D reconstruction unit 104, which is a programmable apparatus which is configured, in particular programmed, to ascertain spatial data sets describing the partial region 102 of the object 103 based at least on the captured optical signals or the electrical representation thereof as digital image signals. The spatial data sets are generated for example as surface or topography data in the format (x, y, z, and color) with color information or in the format (x, y, z, and alpha) with opacity information. In order to be able to perform the 3D reconstruction, the topography of the surface of the situs is determined from the stereo video data and/or using a distance sensor (not illustrated).

The visualization system 100 additionally includes a hologram computational unit 105, which may be a further apparatus or the same programmable apparatus that performs the 3D reconstruction. The hologram computational unit is configured to ascertain, based at least on the spatial data sets of the partial region 102 of the object 103 (that is to say the data that represent a 3D reconstruction of the situs), control data with which a visualization unit 106 is controlled to generate a holographic presentation. The visualization unit 106 is configured to visualize for a user 107 of the visualization system 100, in the example described here for example a surgeon, a holographic presentation 108 of at least the partial region 102 of the object 103. The visualization unit can be realized for example in the form of a spatial light modulator (SLM), as described in U.S. Pat. No. 8,500,284 B2, or as a photophoretic-trap volumetric display, as is described in D. E. Smalley, et al., "A photophoretic-trap volumetric display," Nature volume 553, pages 486-490 (Jan. 25, 2018).

Therefore, a three-dimensional holographic presentation 108 of the partial region 102 of the currently observed object 103, for example of the situs currently being operated on, is available to the user 107 as a computer-generated hologram (CGH).

The latency times between image recording and displays of the holographic presentation are typically kept low. To this end, when using a digital surgical microscope for the 3D reconstruction unit 104, the hologram computational unit 105, and also the visualization unit 106 are integrated in the surgical microscope system or are realized with connections with guaranteed latency times.

In an exemplary embodiment of the visualization system 100, provision is made for an operation in a live mode, that is to say stereoscopic video data of the situs are constantly generated by the optical recording unit 101, and the 3D reconstruction unit 104, the hologram computational unit 105, and the visualization unit 106 are designed to continuously update the spatial data sets, the control data, and the holographic presentation in real time on the basis of the continuously updated optical signals, such that typically a latency time between image recording and update of the holographic presentation of no more than 40 ms, but in any case of less than 100 ms, is achieved to enable comfortable working.

In the exemplary embodiment shown in FIG. 4, the visualization system 100 additionally includes an augmentation unit 109. The latter provides additional data, which were recorded in advance or are likewise currently generated and which can be superimposed on the spatial data sets in order to integrate further information, for example MRT or CT scans, in the holographic presentation to be generated. The hologram computational unit 105 then ascertains the control data for producing the holographic presentation based on the data thus complemented, that is to say the spatial data sets on which the additional data have been superimposed.

In the exemplary embodiment shown in FIG. 4, the visualization system 100 additionally includes an interaction capturing unit 110, with which interactions of the user 107 with the holographic presentation 108 can be captured. In the exemplary embodiment, the interaction capturing unit 108 includes a camera having an integrated programmable apparatus that performs tracking and image analysis to recognize gestures of the user. The interaction can cause a change in the holographic presentation, for example zooming or magnification, or rotating or tilting the holographic presentation.

The interaction capturing unit 110 is connected to an interaction control unit 111, which is connected in particular with the optical recording unit 101 and which can change the settings of the optical recording unit 101 in response to the interactions of the user with the holographic presentation. Here, the interaction control unit 111 controls the optical recording unit 101 in terms of the recording settings thereof, that is to say in particular the magnification and/or focus settings, but also in terms of position and orientation thereof. To this end, the optical recording unit 101 can, for example, either be itself movable robotically or be fastened to a robotic stand (not illustrated) which changes the position and orientation of the optical recording device based on the signals from the interaction control unit.

In FIG. 4, the visualization unit 106 is shown in a first visualization mode, in which the holographic presentation 108 of the partial region 102 of the object 103 is displayed in a manner such that it appears to the user as if it were freely floating in space. The visualization unit 106 can also, in a second visualization mode (not shown), display the holographic presentation of the partial region of the object such that it appears to the user 107 as if it were superimposed on the object, that is to say superimposed directly on the situs of the patient. The holographic presentation 108 can possibly also be limited to the additional data. For this "registered" mode, an imaging specification (registration) exists for adapting the holographic presentation exactly to the position and orientation of the situs of the patient. In particular, the "floating" presentation of the first visualization mode is likewise located within the field of view of the surgeon when the latter looks at the situs on the patient and is controlled by a captured interaction, such as voice, gesture, or a change in viewing direction, and can switch between the two visualization modes, wherein the holographic presentation in the second visualization mode is superimposed on the real situs in accurate register as a "registered" presentation.

In the exemplary embodiment shown in FIG. 4, the visualization system 100 additionally includes a further optical recording unit 112, with which an environment region of the object can be recorded to perform a 3D reconstruction also for the environment region and to be able to generate a corresponding holographic presentation.

In addition, the visualization system 100 shown in FIG. 4 includes a further visualization unit 113, with which a holographic presentation for a further user, for example an assistant, can be visualized.

The visualization system 100 shown in FIG. 4 additionally has a non-optical recording unit 114, with which a non-optical signal from the situs of the patient can be captured. This may be, for example, a recording unit for ultrasound signals.

Figure 5:
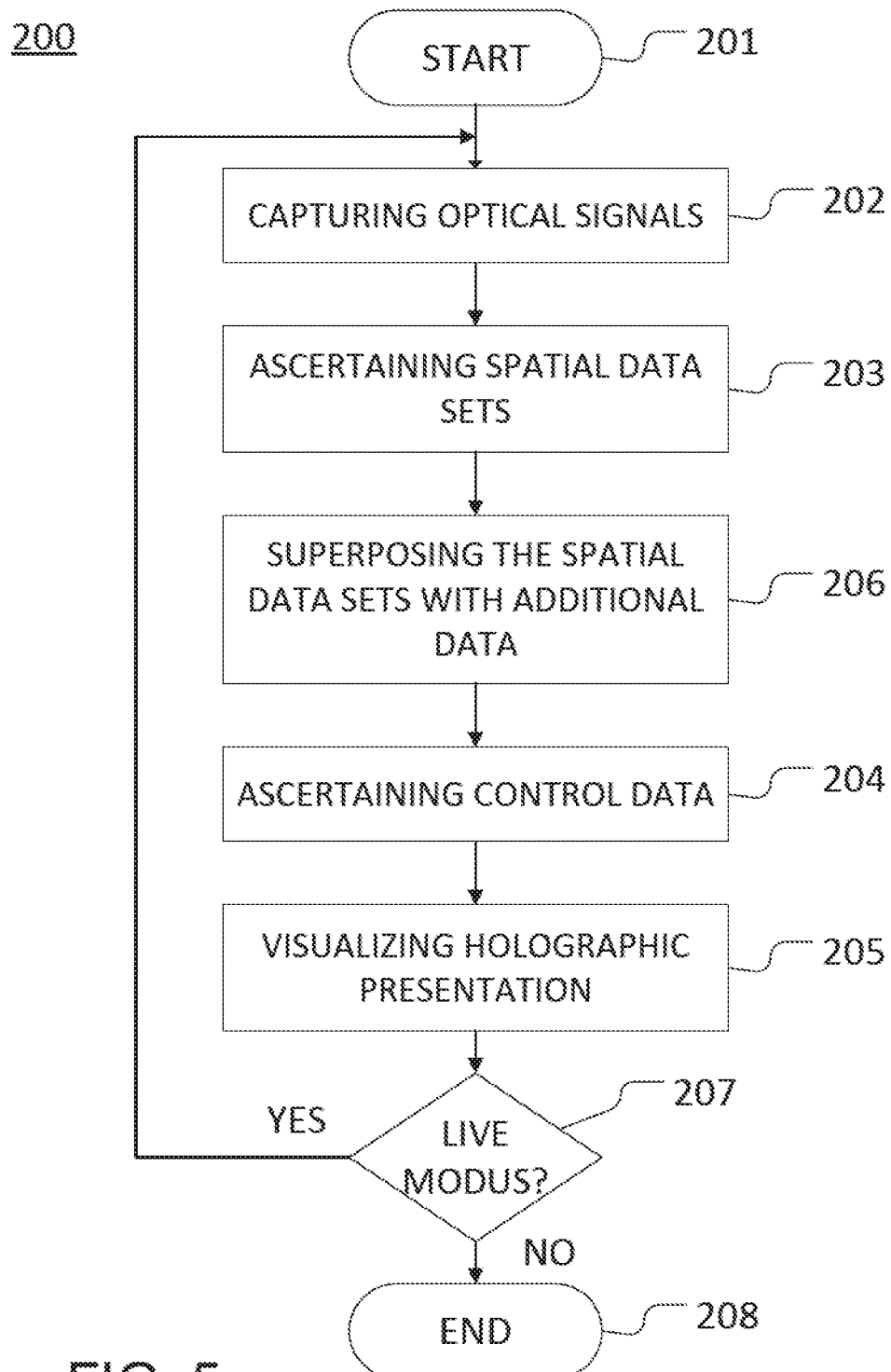
FIG. 5 shows a schematic illustration of an exemplary embodiment of a method for producing holographic presentations from optical signals according to an exemplary embodiment of the disclosure.

FIG. 5 shows a schematic illustration of a method 200 according to an exemplary embodiment of the disclosure for producing holographic presentations from optical signals, carried out by a visualization system. The method 200 begins in a starting state 201, in which the visualization system is activated. In a first method step 202, carried out by an optical recording unit, optical signals characterizing at least a partial region of an object are captured. In a second step 203 carried out by a 3D reconstruction unit, spatial data sets, which describe the partial region of the object are ascertained based at least on the captured optical signals. In a third step 204 carried out by a hologram computational unit, control data for producing a holographic presentation based at least on the spatial data sets of the partial region of the object is ascertained, and, in a fourth step 205 carried out by a visualization unit, visualization of the holographic presentation of at least the partial region of the object based on the control data is performed.

In the exemplary embodiment shown in FIG. 5, the method additionally includes a further step 206 of superposing the spatial data sets ascertained in step 203 with additional data, with the result that the step 204 of the ascertaining of the control data for producing the holographic presentation includes ascertaining the control data based on the spatial data sets on which the additional data are superposed. The visualization of the holographic presentation can here possibly be limited to the additional data.

The method 200 shown in FIG. 5 makes provision for the method steps 202 to 206 to be performed continuously if the visualization system is operated in the live mode. The method illustrated in FIG. 5 therefore makes provision for a live-mode interrogation step 207.

If no live mode is performed or if it has been terminated, the method ends at step 208.

Although the disclosure has been more specifically illustrated and described in detail by the exemplary embodiments, nevertheless the disclosure is not restricted by the exemplary embodiments disclosed and other variations can be derived therefrom by a person skilled in the art, without departing from the scope of protection of the disclosure.

The figures are not necessarily accurate in every detail and to scale and can be presented in enlarged or reduced form for the purpose of better clarity. For this reason, functional details disclosed here should not be understood to be limiting, but merely to be an illustrative basis that gives guidance to a person skilled in this technical field for using the present disclosure in various ways.

It is to be understood that method steps, although they have been described in a specific ordered sequence, can in part be performed in a different sequence than the one described here. It is also to be understood that specific steps can be performed simultaneously, other steps can be added, or specific steps described here may be omitted. In other words, the present descriptions are offered for the purpose of illustrating exemplary embodiments and should not be interpreted as being a limitation of the subject matter disclosed.

For example, in order to be able to correspond to a real-time demand, a visualization system which performs the described method steps will typically be designed in strongly parallelized fashion such that the method steps are not necessarily performed sequentially. That is to say, for example in particular when the optical recording unit applies a scanning method, for example an OCT scanner, parallelized processing of recorded image data to spatial data elements is performed still during the recording of further image elements which belong to the image that is currently to be recorded. The calculation of the holographic presentation can in this case also begin already for already available data.

To the extent that nothing else is specified, terms such as "first" and "second" or "further" or the like (for example, first and second visualization mode, etc.) were used to distinguish between the respective elements. Therefore, the use of the terms does not necessarily imply a functional or any other prioritization of one or the other element.

The expression "and/or" used here, when it is used in a series of two or more elements, means that any of the elements listed can be used alone, or any combination of two or more of the elements listed can be used. For example, if a composition is described as containing the components A, B and/or C, the composition can contain A alone; B alone; C alone; A and B in combination; A and C in combination; B and C in combination; or A, B, and C in combination.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B", "A has B", "A comprises B" or "A includes B" may refer both to the situation in which no further element aside from B is provided in A (that is to say to a situation in which A is composed exclusively of B) and to the situation in which, in addition to B, one or more further elements are provided in A, for example element C, elements C and D, or even further elements.

Furthermore, the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by the person skilled in the art, can also be carried out using other configurations. Similarly, features introduced by "in one embodiment of the invention" or "in one exemplary embodiment of the invention" are to be understood to be optional features, without this being intended to restrict alternative refinements or the scope of protection of the independent claims. Furthermore, all possibilities of combining the features introduced by these introductory expressions with other features, whether optional or non-optional features, are intended to remain unaffected by said introductory expressions.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

2 Surgical microscope
3 Object field
5 Objective
7 Divergent beam
9 Beam
9A, 9B Stereoscopic partial beam path
11 Magnification changer
13A, 13B Interface arrangement
15A, 15B Beam splitter prism
19 Camera adapter
21 Camera
23 Image sensor
27 Binocular tube
29A, 29B Tube objective
31A, 31B Intermediate image plane
33A, 33B Prism
35A, 35B Eyepiece lens
37 Display
39 Optical unit
41 White light source
43 Deflection mirror
45 Illumination optical unit
48 Digital surgical microscope
49A, 49B Focusing lenses
50 Varifocal objective
51 Positive member
52 Negative member
53 Displacement path
60 Microscope body
61A, 61B Image sensors
63A, 63B Displays
65A, 65B Eyepiece lenses
67A, 67B Cable
100 Visualization system
101 Optical recording unit
102 Partial region of the object
103 Object
104 3D reconstruction unit
105 Hologram computational unit
106 Visualization unit
107 User
108 Holographic presentation
109 Augmentation unit
110 Interaction capturing unit
111 Interaction control unit
112 Further optical recording unit
113 Further visualization unit
114 Non-optical recording unit
200 Method
201 Start
202 Capturing optical signals
203 Ascertaining spatial data sets
204 Ascertaining control data
205 Visualizing the holographic presentation
206 Superimposition of additional data
207 Live mode interrogation
208 End

What is claimed is:

1. A visualization system comprising:
an optical recording unit configured to capture optical signals characterizing at least one partial region of an object;
a visualization unit configured to visualize a holographic presentation of the at least one partial region of the object for a user of the visualization system based on control data, the visualization system comprising:
a 3D reconstruction unit configured to ascertain spatial data sets describing the at least one partial region of the object based on the optical signals; and
a hologram computational unit configured to ascertain the control data for generating the holographic presentation based on the spatial data sets of the at least one partial region of the object;
an interaction capturing unit including means for capturing an interaction of the user of the visualization system with the holographic presentation, and
an interaction control unit configured to control the optical recording unit by changing recording settings of the optical recording unit in response to the interaction of the user with the holographic presentation, wherein the recording settings include magnification settings, focus settings, and settings of a position and an orientation of the optical recording unit.

2. The visualization system as claimed in claim 1, wherein:
the optical recording unit, the 3D reconstruction unit, the hologram computational unit and the visualization unit are configured to continuously update the optical signals, the spatial data sets, the control data, and the holographic presentation in a live mode, and
the holographic presentation is updated at intervals of less than 150 ms.

3. The visualization system as claimed in claim 1, wherein the spatial data sets include surface data elements or voxel data elements with a color information component.

4. The visualization system as claimed in claim 1, wherein the spatial data sets include surface data elements or voxel data elements with an opacity information component.

5. The visualization system as claimed in claim 1, wherein the optical recording unit is configured to capture distance information assigned to the optical signals.

6. The visualization system as claimed in claim 1, wherein:
the hologram computational unit includes means for computationally producing stereo views from the spatial data sets, and
the means for computationally producing the stereo views from the spatial data sets are configured to generate the stereo views to permit an adaptation to a pupillary distance of the user of the visualization system.

7. The visualization system as claimed in claim 1, wherein the optical recording unit is provided in a main body of a surgical microscope.

8. The visualization system as claimed in claim 1, further comprising:
an augmentation unit including means for superimposing additional data on the spatial data sets; and
wherein the hologram computational unit is configured to ascertain the control data for producing the holographic presentation based on the spatial data sets on which additional data are superimposed.

9. The visualization system as claimed in claim 1, wherein the visualization unit is configured to:
display, in a first visualization mode, the holographic presentation of the at least one partial region of the object to permit the holographic presentation to appear to the user as if it were freely floating in space,
display, in a second visualization mode, the holographic presentation of the at least one partial region of the object to permit the holographic presentation to appear to the user as if it were superimposed on the at least one partial region of the object, and
switch between the first visualization mode and the second visualization mode depending on an input by the user.

10. The visualization system as claimed in claim 1, wherein the visualization unit is configured to display, in a second visualization mode, the holographic presentation of the at least one partial region of the object to permit the holographic presentation to appear to the user as if it were superimposed on the at least one partial region of the object.

11. The visualization system as claimed in claim 1, further comprising:
at least one further optical recording unit including further means for capturing further optical signals characterizing at least one environment region of the object, and
at least one further visualization unit configured to visualize the holographic presentation for a further user.

12. The visualization system as claimed in claim 1, wherein the optical signals comprise stereoscopic image data of the at least one partial region of the object.

13. The visualization system as claimed in claim 1, wherein the optical signals comprise optical coherence tomography scans of the at least one partial region of the object.

14. The visualization system as claimed in claim 1, wherein the optical signals comprise endoscopic recordings of the at least one partial region of the object.

15. The visualization system as claimed in claim 1, further comprising:
a non-optical recording unit configured to capture non-optical signals characterizing at least one proportion of the at least one partial region of the object; and
wherein the 3D reconstruction unit is configured to ascertain the spatial data sets, which describe the at least one partial region of the object, based on non-optical signals.

16. A visualization system with a superimposition mode, the visualization system comprising:
an optical recording unit configured to capture optical signals characterizing at least one partial region of an object;
a visualization unit configured to visualize a holographic presentation for a user of the visualization system with the superimposition mode and to permit the holographic presentation to appear to the user in a manner in which it is superimposed on the at least one partial region of the object;
an interaction capturing unit including means for capturing an interaction of the user of the visualization system with the holographic presentation, and
an interaction control unit configured to control the optical recording unit by changing recording settings of the optical recording unit in response to the interaction of the user with the holographic presentation, wherein the recording settings include magnification settings, focus settings, and settings of a position and an orientation of the optical recording unit.

17. A method for generating holographic presentations from optical signals, the method comprising:
capturing optical signals characterizing at least one partial region of an object;
ascertaining spatial data sets describing the at least one partial region of the object based on the optical signals;
ascertaining control data for producing a holographic presentation based on spatial data sets of the at least one partial region of the object;
visualizing the holographic presentation of the at least one partial region of the object based on control data;
capturing an interaction of the user of the visualization system with the holographic presentation, and
controlling the optical recording unit by changing recording settings of the optical recording unit in response to the interaction of the user with the holographic presentation, wherein the recording settings include magnification settings, focus settings, and settings of a position and an orientation of the optical recording unit.

18. The method as claimed in claim 17, further comprising
superposing the spatial data sets with additional data; and
continuously updating the optical signals, the spatial data sets, the control data, and the holographic presentation in a live mode, wherein the ascertaining of the control data for producing the holographic presentation comprises ascertaining the control data based on the spatial data sets on which the additional data are superposed, and wherein the holographic presentation is updated at intervals of less than 150 ms.

19. A method for visualizing holographic presentations, the method comprising:

capturing optical signals characterizing at least one partial region of an object;

visualizing a holographic presentation for a user of a visualization system with superimposition mode;

displaying the holographic presentation to permit the holographic presentation to appear to the user as if the holographic presentation were superimposed on the at least one partial region of the object;

capturing an interaction of the user of the visualization system with the holographic presentation, and controlling the optical recording unit by changing recording settings of the optical recording unit in response to the interaction of the user with the holographic presentation, wherein the recording settings include magnification settings, focus settings, and settings of a position and an orientation of the optical recording unit.

* * * * *